Nov. 1, 1938.  G. A. CHARLSTON  2,135,102
SAFETY GUARD FOR GLASS COFFEE MAKERS
Filed March 26, 1938
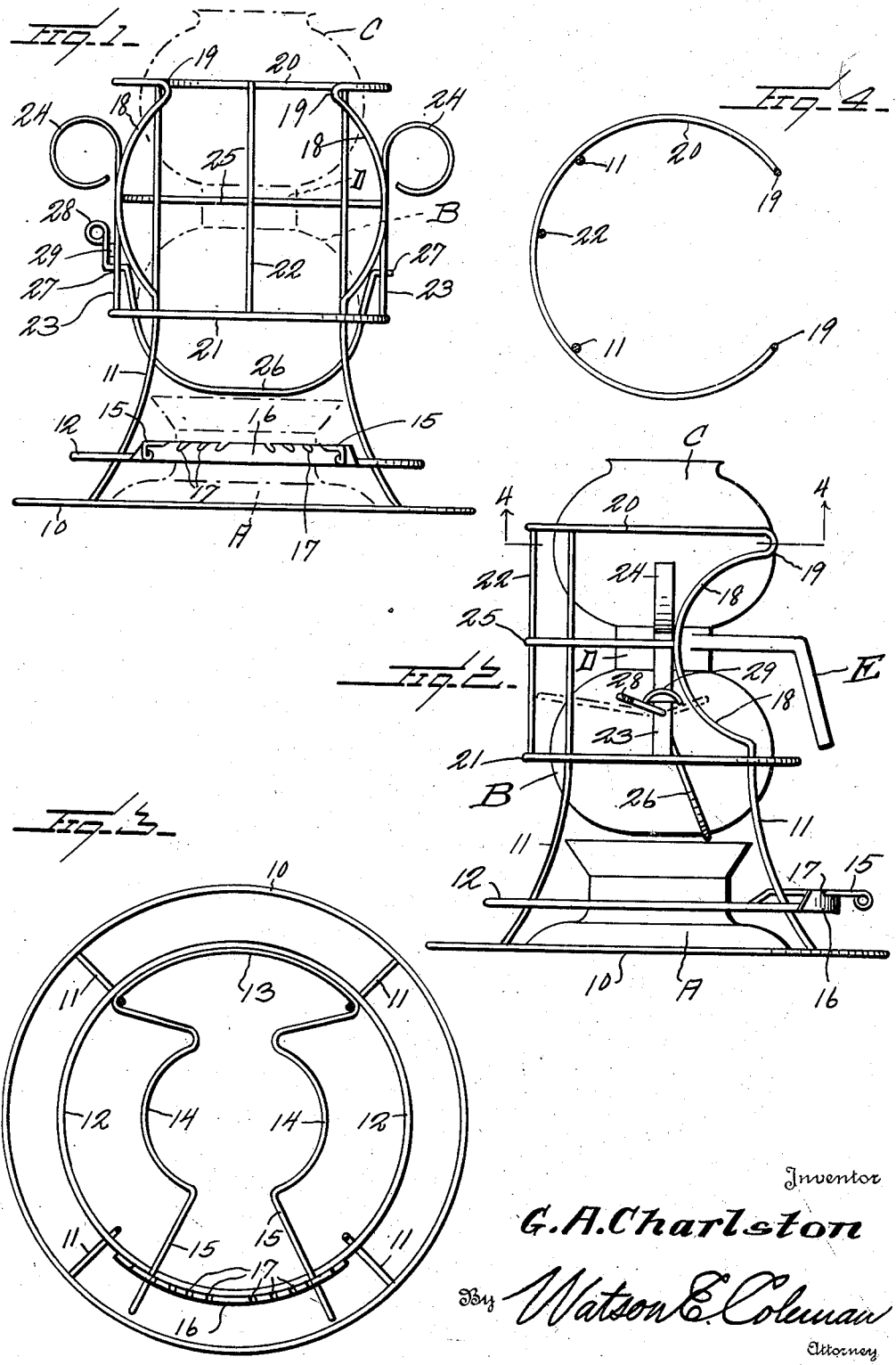
Inventor
G. A. Charlston
By Watson E. Coleman
Attorney Patented Nov. 1, 1938

2,135,102

UNITED STATES PATENT OFFICE 2,135,102

SAFETY GUARD FOR GLASS COFFEE MAKERS

Gustave A. Charlston, Portland, Oreg.

Application March 26, 1938, Serial No. 198,305

5 Claims. (Cl. 53—3)

This invention relates to devices for protecting or guarding the bulbous glass coffee makers which are so commonly used today. The object of the invention is to provide a cheaply constructed, yet ornamental guard which will prevent the coffee machine from being tipped over or broken, and provide a protector within which the coffee machine may be stored when not in use.

Another object is to provide a device of this character of open-work construction and having handles, and provide means for supporting the coffee-making vessels within this open-work guard, and provide means for supporting the heating element within the guard so that the guard and the coffee machine may be handled as a unit.

A further object is to provide means whereby the heating element may be clamped in place within the open-work frame at the base thereof and whereby the lower glass vessel of the coffee machine may be either raised off of close contact with the heating element or lowered into engagement therewith.

Other objects will appear in the course of the following description.

My invention is illustrated in the accompanying drawing wherein:

Fig. 1 is a front elevation of my protector, the glass coffee machine being shown in dotted lines;

Fig. 2 is a side elevation of the structure shown in Fig. 1 and showing in full lines the coffee machine in a lifted position and in dotted lines the position of the cradle when the coffee machine is in lowered position onto the heating element;

Fig. 3 is a top plan view of the base, the vertically extending wires being in section;

Fig. 4 is a section on the line 4—4 of Fig. 2.

Referring to the drawing, 10 designates a base ring illustrated as formed of wire, though I do not wish to be limited to this. Extending upward from this base ring are four more or less vertical wires 11, which are attached at their ends to the ring 10. These vertical wires curve centrally and upward and at their upper ends are conjoined with other wires to form a protective cage within which the coffee machine may be placed, as will be later stated. Just above the base 10 is an annular wire 12 and inward of this annular wire at the back of the protector, is an arcuate section of wire 13 welded, soldered or otherwise connected to the ring 12, the ends of this arcuate wire 13 being curved around the rear vertical members 11, then extended inward and then outward to form a bowed portion 14, and then extended radially outward, as at 15. The opposed bowed portions 14 constitute spring clamps adapted to surround the neck of a heating element A. The clamp may be held in its contracted position by an arcuate bar 16 attached to the ring 12 at the front thereof and formed with notches 17 extending upward above the ring 12 and with which the arms 15 can engage. The notches on one side of the middle of this bar 16 are inclined in one direction while the opposite notches are inclined in the opposite direction, as shown in Fig. 1. It will be seen, of course, that the heating element A rests on the table or other support and that the clamps 14 engaging around the neck of this heating element hold it in central position.

The two rear vertical elements 11 are curved centrally and upward for a certain distance and then extend straight upward. The two front elements 11 extend upward and centrally from the base and then are curved rearwardly to form a relatively large bowed portion 18 and at their upper ends are again curved rearwardly, as at 19, and extended in a circle to form a top ring segment 20, as shown in Fig. 4. This segment constitutes an open ring opening toward the front, and while I have described the wires 11 as being formed to provide an integral bowed portion 18 and an integral ring segment 20, I do not wish to be limited to this. The rear wires 11 extend straight upward, as before stated, and are soldered, brazed or otherwise connected to this ring segment 20. Disposed at the upper ends of the inwardly curved portions 11 is a ring 21 brazed, welded or otherwise attached to the members 11. Connecting the rearmost portions of the ring 21 and the ring segment 20 is the vertical wire or element 22. It will be noted that the arcuate portions 18 are not only curved rearwardly, as shown in Fig. 2, but are curved laterally, as shown in Fig. 1.

Attached to diametrically opposite portions of the ring 21 are two vertical strips 23, the upper ends of which are laterally curved to form handles 24. These strips 23 extend straight downward and are attached at their lower ends to the ring 21 and intermediate their ends to a semi-circular wire 25, which is attached as by brazing or welding to the wires 11 and 22. For the purpose of supporting the lower vessel B of the coffee machine in spaced relation to the heating element A, I provide an approximately semi-circular wire 26, which constitutes a cradle, this wire at its ends being laterally bent to form pivots 27 extending through the strip 23, one of these pivots being formed with a handle 28 which extends upward and operates over a notched arcuate latching member 29, so that the cradle may be held either in the position shown in full lines in Fig. 2 or in the position shown in dotted lines in this figure.

Coffee machines of the character stated consist essentially of a lower globular vessel B and an upper globular vessel C connected by a neck D having a handle E projecting therefrom. Ordinarily, with machines of this type, the lower vessel B rests upon the upwardly extending flange of the heating element A, which is quite commonly an electric heating element. When the lower vessel B is inserted within the flaring flange of the heating element A, the electric heater comes in intimate contact with the lower vessel B, causes the water to boil therein and pass upward into the upper vessel C and through the coffee contained therein. When the coffee is made, both vessels are removed from the heating element whereupon such removal, the coffee contained in the upper vessel discharges into the lower vessel. The upper vessel is then removed and the lower vessel is used as a coffee pot by means of the handle E. With my construction, if it be desired to keep the coffee warm without bringing it in such close contiguity to the heating element that the coffee will boil, the cradle 26 is swung downward from the dotted line position to the full line position and as it swings downward, it gradually lifts the vessel B from the heating element. Obviously, the cradle 26 may be swung downward with the vessel C in place above the vessel B, if desired. Thus the two vessels B and C may be supported on the cradle 26 until it be desired to make the coffee, when the cradle may be swung rearward, which will lower the connected vessels downward onto the heating element.

In order to remove either or both vessels B and C from the protector, the handle E is used to lift both vessels upward until the neck D is opposite the opening in the segment 20 whereupon both vessels may be drawn outward. Of course, this equally applies to lifting the vessel B without the vessel C out of the protector.

While I have illustrated this protector as made of wire, it is to be understood that it might be made of strap metal, wood or of various combinations of wood, metal and composition. This protector is adaptable for use with many different varieties of glass coffee-makers. The device makes the use of the glass coffee maker much safer. It prevents breakage; it prevents accidental tipping over of the coffee-maker, enhances its beauty, and provides for storing the coffee-maker when not in use. It will be seen that the device embodies an open-work gauge within which the heating element and the vessels B and C are normally disposed and are thus protected.

While I have illustrated certain details of construction and certain definite arrangement of parts, I do not wish to be limited thereto, as many changes might be made therein without departing from the spirit of the invention as defined in the appended claims.

What is claimed is:—

1. A safety guard for coffee machines, including an annular base adapted to surround the heating element of the coffee machine, an open-work cage-like frame supported on the base within which the coffee machine may be disposed, the frame being formed and constructed to extend partly around the coffee machine, and means carried on the frame constructed and arranged to support the coffee machine in spaced relation to the heating element, said means being shiftable out of the way to permit the coffee machine to be lowered onto the heating element.

2. A safety guard for coffee machines, including an annular base, means on the base for clamping a heating element in place within the base, an open-work cage-like frame supported on the base and within which the coffee machine may be disposed, the frame having an opening at its upper end slightly greater than the neck between the upper and lower vessels of the coffee machine, and means carried on the frame constructed and arranged to support the upper and lower vessels in spaced relation to the heating element, said means being shiftable to permit the lower vessel of the coffee machine to be lowered onto the heating element.

3. A safety guard for coffee machines, including an annular base, legs extending upward and inward from the base, a heating element, clamping means mounted upon said legs just above the base, the rear pair of legs extending straight upward, the front pair of legs being bowed inward and laterally, a segmental member connected to the upper ends of the front and rear legs, a ring connected to the front and rear legs below the bowed portion of the front legs, opposed members extending upward from said ring on each side of the protector and formed to provide laterally projecting handles at their upper ends, and a cradle approximately semi-circular in form and having its ends pivoted in said strips and means whereby the cradle may be shifted from a depending position to a raised position and held in either of said positions.

4. A safety guard for coffee machines, including an annular base, a pair of front legs and a pair of rear legs attached to and extending upward from the base, a ring attached to said legs above the base ring, an arcuate element attached to the rear portion of said ring and bent to form two opposed approximately semi-circular clamps and two arms extending forward from the clamps in divergent relation, said clamps being resiliently urged away from each other, means on the ring for engaging said arms and holding the clamp contracted on a heating element, and a cage carried by the upper ends of the legs and attached to partially embrace the upper vessel of a coffee making machine.

5. A safety guard for coffee machines, including an annular base, a rear pair of legs and a forward pair of legs extending upward and inward from the base, the rear pair of legs then extending straight upward, the front pair of legs extending inward and centrally, then being rearwardly and laterally bowed, a segmental member to which the upper ends of the forward and rear pairs of legs are attached, the segmental member defining an opening at the front of the protector less in width than the diameter of the uppermost vessel of the coffee machine large enough to permit the passage of the neck of said coffee machine when the machine is lifted, a ring attached to the legs at the upper ends of their upwardly and inwardly curved portions, vertical elements connecting the upper segment with said ring, strips extending upward from the ring and at their upper ends outwardly curved to form laterally disposed handles, a semi-circular member attached at its ends to said strips and engaged with said legs and acting to brace the strips, a semi-circular cradle having its ends outwardly bent to constitute pivots and extending through said strip, one of said pivots being formed to provide an upwardly extending handle, and a serrated arcuate member over which said handle operates whereby the semi-circular member may be held either in a depending position beneath the lowermost vessel or raised out of such depending position.

GUSTAVE A. CHARLSTON.